(12) United States Patent
Sohn et al.

(10) Patent No.: US 7,663,293 B2
(45) Date of Patent: Feb. 16, 2010

(54) LINEAR MOTION ACTUATOR

(75) Inventors: Juergen Sohn, Esslingen (DE); Sven Langbein, Menden (DE); René Niethammer, Stuttgart (DE); Ewald Georg Welp, Duesseldorf (DE)

(73) Assignee: Otto Egelhof GmbH & Co. KG, Fellbach (DE)

( * ) Notice: Subject to any disclaimer, the term of this patent is extended or adjusted under 35 U.S.C. 154(b) by 326 days.

(21) Appl. No.: 11/704,900

(22) Filed: Feb. 9, 2007

(65) Prior Publication Data

US 2008/0018198 A1    Jan. 24, 2008

(30) Foreign Application Priority Data

Feb. 9, 2006   (DE) .................. 10 2006 006 239
Aug. 10, 2006  (DE) .................. 10 2006 037 650

(51) Int. Cl.
*H01L 41/08* (2006.01)
(52) U.S. Cl. ........................................ 310/328
(58) Field of Classification Search .......... 310/306, 310/307, 328
See application file for complete search history.

(56) References Cited

U.S. PATENT DOCUMENTS

| 4,806,815 | A | 2/1989 | Honma |
| 5,821,664 | A * | 10/1998 | Shahinpoor ................. 310/307 |
| 6,762,515 | B2 * | 7/2004 | Gummin et al. ............... 310/12 |
| 7,104,056 | B2 * | 9/2006 | Taya et al. .................... 60/527 |
| 7,199,501 | B2 * | 4/2007 | Pei et al. ...................... 310/311 |
| 2002/0185932 | A1 * | 12/2002 | Gummin et al. ............. 310/307 |
| 2008/0278030 | A1 * | 11/2008 | Hara et al. ................... 310/307 |

* cited by examiner

*Primary Examiner*—Mark Budd
(74) *Attorney, Agent, or Firm*—Kriegsman & Kriegsman

(57) ABSTRACT

The invention relates to a linear motion actuator, comprising an operating member (12), which can be displaced from a basic position (14) in a control position (31) against the force of a spring member (28) using at least one actuating element (22), the operating member (12) being held in the basic position (14) by applying the force of the spring member (28) and the force of the spring member (28) acting on the operating member (12) being smaller than an actuating force of at least one actuating element (22) that is made of shape memory alloy, wherein the spring member (28) is configured as part of a carrier device (61), which comprises an operating member (12) or to which an operating member (12) may be attached.

29 Claims, 2 Drawing Sheets

LINEAR MOTION ACTUATOR

Figure 1:
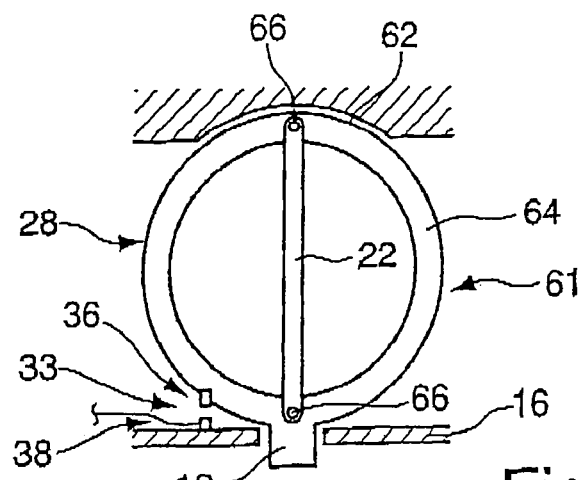

The invention relates to a linear motion actuator according to the preamble of claim 1.

A linear motion actuator of this type is known from U.S. Pat. No. 4,806,815. This linear motion actuator comprises an operating member, which is connected to an actuating member operating against the force of a spring member, so that the operating member can be displaced from a basic position in a control position. The spring member is configured as a tension element and exerts force on one end of the operating member. The actuating member, which is made of a shape memory alloy, exerts force on the same end of the operating member. Actuating members of this type made of shape memory alloy have the advantage that as a result of the activation via a current the shape is modified above a certain limit temperature, wherein the temperature change in the material is produced based on the resistance thereof as a function of the power supplied. As soon as the actuating member has cooled off again, the actuating member returns to the initial shape as a result of the shape memory. When designing a linear motion actuator of this type, it is provided that the force of the actuating member is at least slightly greater than the force of the spring member, so that the operating member can be displaced from a basic position in a control position.

Linear motion actuators of this type have the advantage of a silent actuating motion and/or stroke of the operating member. As a result, they have a variety of applications.

This embodiment has the disadvantage that a plurality of components are required for forming a linear motion actuator and that these components are specifically tailored to the respective application.

A universal application or quick adaptation to modified application conditions is not possible.

It is therefore the object of the invention to create a linear motion actuator, which has a simple design and allows greater flexibility for different applications.

This object is achieved according to the invention with the characteristics of claim 1. Further advantageous embodiments and further developments of the invention are disclosed in the remaining claims.

By configuring at least one spring member as part of a carrier device on which the operating member can be provided or attached, the number of components can be reduced since at least one spring member is integrated in the carrier device. Furthermore, this integration of the spring member as part of the carrier device for the purpose of controlling the operating member offers the advantage that an assembly comprising at least one pre-assembled actuating element made of a shape memory alloy is provided, which assembly enables the direct installation at various points of use for different applications in order to produce a linear motion actuator. Reducing the number of components furthermore allows decreased manufacturing costs and assembly time. At the same time, a standardized series of carrier devices with varying strokes and/or actuating forces can be provided with this type of assembly.

According to an advantageous embodiment of the invention, provision is made for the carrier device to include a retaining or receiving section, on which the carrier device is supported in one housing section when transferring the actuating element from a basic position to a control position. This retaining section at the same time serves to fix the carrier device in place on the housing section or the point of use.

It is preferable if the carrier element is configured as an elastic profiled or hollow body, particularly a cylindrical pipe section or ring, and the actuating element exerts force on two diametrically opposed wall sections or load transfer elements provided or integrally formed thereon. Consequently, a pre-assembled assembly may be provided, which only requires that the carrier device be positioned in relation to an abutment or housing section in order to use the linear motion actuator. Basic modules of this type allow a plurality of adaptations for a variety of embodiments. Furthermore, carrier devices of this type can be provided in a large variety of sizes, material properties and wall thicknesses to enable a stroke of the operating member as a function of the pressure of at least one spring member. The actuating elements may be disposed on one or both sides on the face-side, interior and/or exterior wall sections and may be adapted accordingly regarding the number of windings. As a result, a variety of assemblies having varying strokes is configured, which are used as needed.

Alternatively, the actuating element or elements may encompass a carrier device and/or act on the outer circumference and/or are enclosed or cast in the body of the carrier device so as to achieve a stroke by appropriately provided wall sections or profiles that can be shorted or deflected.

Alternatively to a closed hollow body, an open profiled body may be provided, for example a U- or Z-shaped body, in relation to which two sections can be displaced towards each other.

According to a first embodiment, the load transfer elements are disposed on the wall section of the carrier device, on which at least one actuating element exerts force, such that one load transfer element is associated with the retaining section and the other load transfer element is associated with the operating member. Particularly in the case of a carrier device configured as a hollow body, this shortens the path between the load transfer elements, thus moving the operating member from a basic position towards the retaining or receiving section.

According to an alternative embodiment of the invention, provision is made for the load transfer element or elements to be offset, preferably by 90°, from the operating member and retaining or receiving section. When applying current to the actuating elements, this way the distance between the operating member and the retaining or receiving section is increased, thus removing the operating member further from a basic position in relation to the retaining section. By disposing the load transfer elements offset by at least 1° from the retaining section, the stroke direction can be controlled at an angle deviating from 90° in relation to the contact or attachment surface of the carrier device. Consequently, flexibility for the installation increases.

According to a further advantageous embodiment of the invention, it is provided that the carrier device comprises two load transfer elements disposed opposite each other in pairs for receiving at least one actuating element on the face-side wall section, which elements preferably are offset 90° from each other. This way a carrier element is produced having a universal design, which is controlled as a function of the stroke direction and the extent of the displacement using actuating elements. The actuating elements offset 90° from each other can also be controlled successively, thus achieving double the stroke.

According to a further advantageous embodiment of the invention, provision is made for at least one closed winding of an actuating element between two load transfer elements. This may provide for easy assembly of the actuating element on the load transfer elements, enabling at the same time double the load transfer due to the two paths extending parallel to each other. Alternatively, also a plurality of windings of one or more actuating elements may be provided. Likewise, the actuating element may only comprise one winding and may be provided between the load transfer elements. Alternatively, it may be provided that at least one rod-, belt- or wire-shaped actuating element is disposed between the two load transfer elements. Such an actuating element may be configured to have various diameters and/or various cross-sectional geometries for transferring the necessary load-displacement changes to the carrier device.

According to a preferred embodiment of the invention, the operating member is provided on the carrier device interchangeably with a plug or detent connection. This way, the flexibility of the actuator may be increased. The carrier devices thus represent the basis for a modular design, which depending on the application enables adaptation by the operating member, the actuating element or elements, the stroke direction and the amount of the displacement as well as the stroke force.

A further advantageous embodiment of the invention provides that the linear motion actuator comprises a displacement measuring device for detecting a stroke of the operating member. As the operating member is transferred from a basic position in a control position, the displacement measuring device detects the settings of predefined displacements, ensuring that the control position is precisely assumed. The control of the actuating element is here performed as a function of the detected stroke of the operating member. The change in length of the actuating element is consequently determined by the control current as a function of the detected displacement. As a result, different parameters affecting the stroke position of the operating member can be taken into consideration in the control of the actuating element. For example, high ambient temperatures or working temperatures influence or change the contraction of at least one actuating element so that at a defined current, for example, the corresponding known contraction of the actuating element additionally changes based on the ambient temperature. Additional effects, such as the change in a characteristic curve of the spring member, friction or the like, can thus also be taken into consideration for the stroke of the operating member into a control position.

According to a further advantageous embodiment of the invention, provision is made for the displacement measuring device to be configured as a mechanical, inductive, capacitive or optical detection device or as a detection device comprising electromagnetic radiation. Depending on the application, the available installation space and the accuracy of the displacement of the positioning member to be monitored, the detection device is selected accordingly.

A preferred embodiment is provided by the use of Hall sensors, wherein an element of the Hall sensor, the Hall probe or the magnetic element is provided on or in the vicinity of the operating member. This has the advantage that the mass to be moved by the actuating element is kept small, achieving faster actuating times.

According to a preferred embodiment of the invention, the operating member is fixed in place by a catch or retaining device after performing a stroke and assuming a final stroke position and/or the control position. As a result, the current applied to at least one actuating element can be turned off after fixing the operating member in place. This has the advantage that a change in length of the actuating element caused by additional factors, such as the ambient temperature, is prevented. Furthermore, it allows power savings. In addition, the fixation of the operating member by the catch or retaining device allows the precisely set position to be maintained, so that this linear motion actuator is also suited for applications that are exposed to vibrations or jolting, such as in a motor vehicle.

The catch or retaining device is configured as a clamping device, which exerts force directly on the operating member or on a clamping section, which is connected to the operating member. This way, a continuous variation of the stroke and hence high flexibility will be given. The clamping device may be configured, for example, in the form of a two-jaw clamping device or as wedge-shaped tongs or the like.

Alternatively, the catch or retaining device comprises a locking element, which in the locked position interacts with a detent element disposed on the operating member. This way various detent positions can be maintained. This embodiment enables a continuous variation of the stroke.

It is preferable if the detent element provided on the operating member and the locking element exerting force on the detent element have rows of teeth, a pawl arrangement, self-locking wedging or stepped wedging. This locking configuration is designed such that the operating member automatically assumes and maintains a control position after the actuating element is de-energized due to the spring force acting on the operating member.

According to a further advantageous embodiment of the invention, provision is made for the locking element of the catch or retaining device to be controlled or actuated by an unlocking element made of shape memory alloy, by means of which element the locking element can be displaced from a locking position in an unlocking position. As a result, uniform control of the operating member and of the locking element can be provided by the shape memory alloy actuating element and the unlocking element.

So as to transfer the operating member from a control position in a basic position, it is provided according to a preferred embodiment of the invention that at least one actuating element exerting force on the operating member is controlled prior to unlocking the operating member, so that the actuating element can be adjusted in its stroke to a stroke that is slightly shorter than that of the controlled stroke position. This allows gentle lifting of the operating member, at least slightly, out of the locked control position before the unlocking element is actuated in order to release the locking element from the clamping, wedging, toothing or the like with the operating member. With such a control mechanism, gently rising characteristic curves for jolt-free actuating motions can be achieved.

According to a further preferred embodiment of the invention, it is provided that at least two carrier devices are arranged in series and that a stroke of at least one carrier device can be transferred to the operating member controlled by all carrier devices. This way, a multi-stage controller can be formed, wherein the carrier devices connected in series together form a linear motion actuator. The total stroke can be formed by such a series connection of individual carrier devices by forming the sum of the individual strokes of each carrier device.

So as to increase stroke power, two or more carrier devices or multi-stage controllers may be connected in parallel to each other, which actuate a common actuating member.

In order to form a linear motion actuator with the carrier device connected in series, it is preferable if each individual carrier device or each individual linear motion actuator module can be controlled individually. A multi-stage actuator can be formed using simple programming of a controller, wherein each stroke is limited in its maximum displacement and thus defined. In addition, within each displacement of a linear motion actuator module, a proportional controller may be provided, which is dependent on the control current.

According to a further advantageous embodiment of the invention, provision is made for at least one actuating element to be activated starting at a heating temperature of more than 70° C. This limit temperature for shape memory alloys has the advantage that without power supply no contraction or change in length takes place, thus guaranteeing that the basic position is maintained.

According to a further advantageous embodiment of the invention, a uniaxially supported lever mechanism is provided for reversing the direction of motion of the operating member. This way, the stroke of the operating member can be oriented in the same direction as the direction of force of the spring member. In addition, further gear elements may be provided, which allow a reversal of the stroke in a direction of motion deviating from the same.

According to a further advantageous embodiment of the invention, provision is made for the actuating element to rest against at least one deflecting element to increase the stroke and thus the length of the actuating element. Conventionally, wires made of shape memory alloy are used, which are made, for example, of an NiTi alloy, an alloy on Cu basis or Fe basis or memory plastic. These wires enable a change in length of up to eight percent depending on the diameter, so that the deflecting elements enable a space-saving arrangement of long actuating elements if larger strokes are required. In addition, a cable control system or further gear mechanisms may be interposed to achieve a displacement ratio.

The carrier device of the linear motion actuator is preferably made of an elastic material, which after deformation returns to the original position. For example, metal materials may be used, so that the carrier device may be made of spring steel or the like. Alternatively, plastics may be provided, for example thermoplastic materials. In addition, also composite materials may be provided, which have the same effect.

Figure 2:
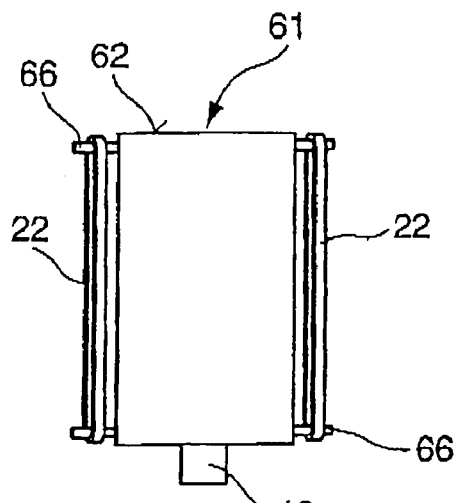
Figure 3:
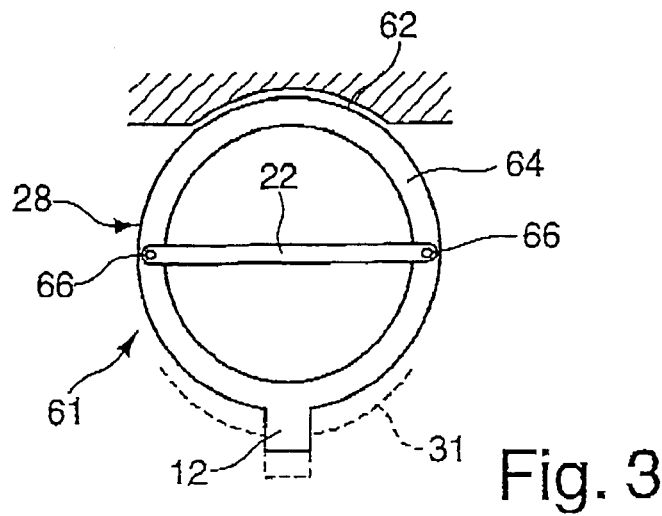
Figure 4:
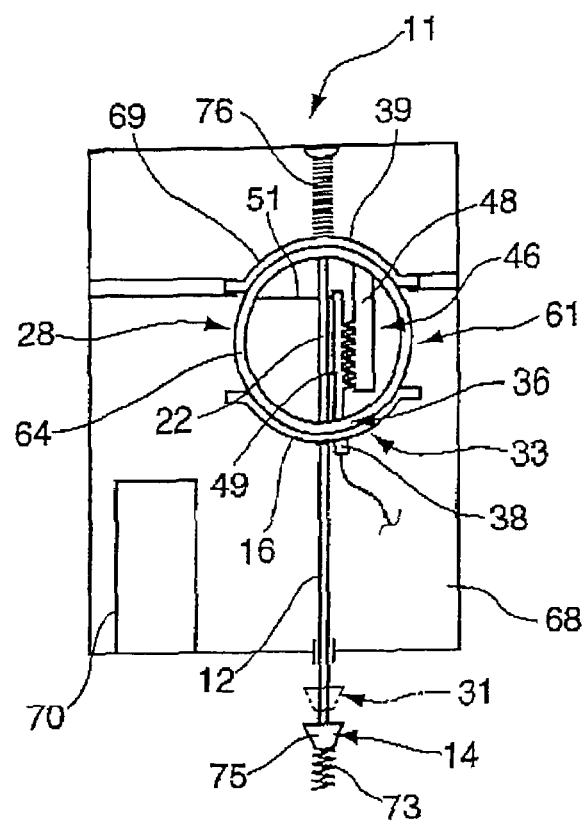
Figure 5:
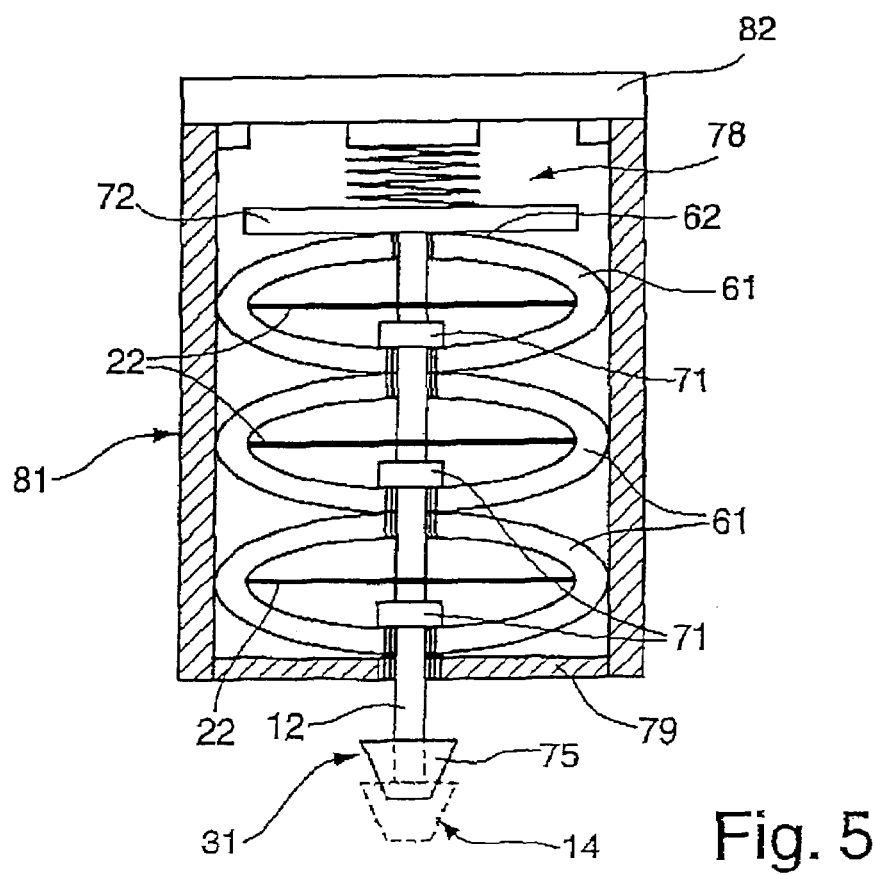

The invention as well as further advantageous embodiments and further developments of the same will be described and explained in more detail hereinafter with reference to the embodiments that are illustrated in the figures. The characteristics apparent from the description and the figures may be used either alone or in groups in arbitrary combinations according to the invention. Shown are:

FIG. 1 a schematic, simplified illustration of a linear motion actuator according to the invention, FIG. 2 a schematic side view of the linear motion actuator according to FIG. 1, FIG. 3 a schematic illustration of an alternative embodiment of FIG. 1, FIG. 4 a schematic illustration of a concrete embodiment of the linear motion actuator, and FIG. 5 a schematic sectional illustration of a further alternative embodiment of FIG. 1.

FIG. 1 shows a schematic illustration of a linear motion actuator 11. Linear motion actuators 11 of this type are used particularly in heating, ventilation and air conditioning installations or systems, particularly in facilities management and automotive engineering, like in water, land and air vehicles. An operating member 12 of the linear motion actuator 11 is positioned in a basic position 14. The linear motion actuator 11 comprises a carrier device 61, in which the spring member 28 is integrated. This carrier device 61 has a contact or retaining section 62, which allows attachment to a stationary housing, a housing section or an abutment of the linear motion actuator 11 for proportional control. According to the exemplary embodiment shown in FIG. 1, the operating member 12 is connected, preferably in one piece, with the spring member 28 so that the carrier device 61 is made exclusively of a single piece. This carrier device 61 is configured, for example, as a ring or cylindrical pipe section or the like. Alternatively, instead of the pipe shape a polygonal or profiled shape may be provided, which offers a certain amount of freedom of movement at least in a radial axial direction. Due to the geometric configuration of the carrier device 61, it assumes a self-locking basic position, in which the operating member 12 is maintained. So as to ensure that this basic position 14 is assumed, the carrier device 61 can rest against an area abutting the operating member 12 at a slight prestressing force by a displacement-limiting element 16, meaning that the clear spring travel of the spring member is slightly shortened.

As is shown according to FIG. 2, on lateral wall sections 64 of the carrier device 61 load transfer elements 66 are provided, on which shape memory alloy actuating elements 22 are positioned. These exert force on the load transfer element 66 with at least one winding. The actuating elements 22 are configured as a function of the stroke. For this, an adaptation in the diameter of the wire, the number of windings as well as the length of the loop may be provided.

In a first embodiment, the load transfer elements 66 are oriented towards the operating member 12 on the one hand and towards the retaining section 62 on the other hand. Consequently, when actuating or applying current to the actuating element or elements 22, the operating member 12 performs a stroke in the direction towards the retaining section 62.

FIG. 3 shows an alternative embodiment to FIGS. 1 and 2. The load transfer elements 66 are provided rotated by 90° on the wall section 64 of the carrier device 61. As a result, when current is applied to the actuating elements 22, an actuating motion of the operating member 12 in a control position 31 is possible, which position is located further away from the retaining or contact section 62 than the basic position 14.

Provision is made in a preferred embodiment for the carrier device 61 to comprise load transfer elements 66 that are disposed opposite each other in pairs, which elements are provided, for example, offset from each other by 90° or other angular degrees. The amount of the stroke can be determined as a function of the angular degrees and the configuration of the actuating elements 22.

FIG. 4 shows an embodiment of a linear motion actuator 11 as a controllable valve. This application is only shown by way of example. Linear motion actuators 11 of this type can be provided for any number and variety of applications for controlling proportional displacements.

The carrier device 61 according to FIG. 1 is inserted in a housing 68 as an assembly, wherein the retaining section 62 rests against a housing section 39 in the housing 68 or is attached thereto. Opposite thereof, a displacement-limiting element 16 is provided on the housing 68, ensuring that the carrier device 61 is biased at least slightly. As a result, a valve closing member 75 is held in an aperture, which is not shown, with at least a small amount of force. This valve closing member 75 may be provided on the operating member 12 via a transmission element. The valve closing member 75 may only comprise the truncated cone-shaped closing body as such, or it may additionally comprise the stroke transmission element, which extends from the carrier device 61 to the outside of the housing 68.

The carrier device 61 is controlled using supply lines 76 leading to the power supply 70. When applying current to the actuating elements 22, the valve closing member 75 performs an upward stroke, wherein a restoring spring 73 supports this stroke or opening motion. A displacement measuring device 33 is provided for detecting this stroke, which device detects, for example, a stroke between the actuating element 12 and the displacement-limiting element 16. It is preferable if this displacement measuring device 33 is formed by a Hall probe 38 attached to the displacement-limiting element 16 and a magnetic element 36 disposed on the carrier device 61. This arrangement may also be reversed. As a result, a precise opening position of the valve closing member 75 may be set. Using a controller, which is not shown in detail, at the same time the shortening of the actuating element 22 or the amount of shortening may be controlled, allowing precise proportional displacements of the valve closing member 75 to be set. A control voltage of the displacement measuring device 33 may be used as the output signal for the visual, acoustic and/or electronic display of the displacement. Alternatively, a mechanical display may be provided, for example using an extendable pin.

After reaching a control position 31, which corresponds to an opening position of the valve closing member 75 in relation to a valve seat, this position may be fixed and secured using a catch or retaining device 46. For example, a locking element 48 that is disposed on the housing section 39 is provided, which element interacts with a detent element 49 attached to the carrier device 61. On the free end, an unlocking element 51 exerts force on the detent element 49 opposite the contact point of the detent element 49 with the carrier device 61. This unlocking element 51 is made of shape memory alloy, equivalent to the actuating element 22. This unlocking element 51 is likewise actuated by the controller. For unlocking purposes, it may be provided that initially the actuating element 22 is controlled, so that the actuating element 22 assumes the control position 31 again and thus enables quasi force-free unlocking using the unlocking element 51. This way a jerky displacement of the operating member 12 can be prevented when releasing the catch or retaining device 46.

According to one embodiment, which is not shown in detail, it is furthermore provided, that several carrier devices 61 are arranged in series or parallel to each other, wherein a common actuating element is provided, which exerts force on all operating members of the carrier devices 61, which are disposed parallel to each other. As a result, a greater force can be achieved using the same displacement, which increase is proportional to the number of carrier devices 61. This arrangement represents an alternative to increasing the number of actuating elements 22 on the carrier device 61.

FIG. 5 illustrates a further alternative embodiment of a linear motion actuator 11. This linear motion actuator 11 comprises a plurality of carrier devices 61 connected in series, wherein a connecting or coupling element 71 is provided, which connects two adjoining carrier devices 61 with each other or positions a carrier device 61 in relation to a housing bottom 79 or a retaining section 62. The connecting or coupling element 71 may be configured as a separate component, which can be attached or inserted in order to connect the two carrier devices 61. For example, the connecting or coupling element 71 may have a clip shape in order to define two adjoining carrier devices 61 in relation to each other. Likewise, a bore may be provided in each carrier device 61, in which bore the connecting or coupling element 71 can be inserted.

In this embodiment, three carrier devices 61 are connected in series, for example. So as to set a basic position 14 of the operating member 12, in which position the valve closing member 75 assumes a closed position, for example, an energy storing device 78 is provided, which fixes the carrier devices 61 to the housing bottom 79. This energy storing device 78 is configured as a spring member or elastic element.

An end section 72 of the operating member 12 is fixed between the carrier devices 61 arranged in series and the energy storing device 78, so that in a basic position 14 primarily the force of the energy storing device 78 acts on the operating member 12. As a result, a defined position of the operating member 12 is guaranteed at all times. Only when the carrier devices 61 are controlled, do the actuating elements 22 produce a stroke.

In the case of a central arrangement in relation to each carrier device 61, the operating member 12 disposed on the end section 72 may extend along the secondary axis of the carrier device 61. It is preferable if the operating member 12 passes through the connecting elements 71, which are configured as tubular inserts. If in such an arrangement of the operating member 12 the actuating element or elements 22 crosses or cross the longitudinal axis of the operating member 12, the operating member 12 comprises recesses or longitudinal bores to allow displacement without influencing the actuating elements 22. Alternatively, the actuating elements 22 may also be provided on the outer edge region of the retaining sections outside of the operating member 12. A further alternative embodiment of the operating member 12 may be such that the sections extend along one or both sides outside of the carrier devices 61 and are connected to the end section 72. On the opposite end, a valve closing member 75 may be provided, or in the case of two sections extending outside of the carrier device 61 two valve closing members 75.

The carrier devices 61 have an elliptic or oval shape in this embodiment. The actuating element 22 extends along the primary axis of the carrier device 61, thus increasing the secondary axis of the carrier device 61 upon actuation of the actuating element 22, so that the valve closing member 75 disposed in the energy storing device 78 is displaced from a basic position 14 in a control position 31. The actuating elements 22 of the carrier devices 61 can be controlled individually. In the illustrated exemplary embodiment therefore a three-stage controller is provided, which allows the three strokes to be controlled simultaneously or successively. Within each stroke of the carrier device 61, proportional control may be superimposed.

A housing 81 is provided for guiding the carrier devices 61, which housing is closed by a cover 82 after positioning the carrier devices 61 and inserting the energy storing device 78. In a basic position 14, the carrier devices 61 rest against the inside walls of the housing 81 with respect to the primary axis, so that a defined final limit in a basic position 14 is given. The control of the actuating elements 22 may be performed using a contact spring or contact tab provided on the housing inside wall, which spring or tab rests against the actuating element 22 independently from the stroke. Alternatively, also supply lines leading to each actuating element 22 may be provided.

The geometry of the carrier device 61 according to FIG. 5 is shown only by way of example. It is also possible to use round geometries, or other geometries deviating from that. Furthermore, for one-stage control, it is also possible to provide only a single carrier device 61 in such a housing 81. According to this embodiment, the housing 81 is completely closed. Alternatively, the housing 81 may also be configured as an open cage, in which the carrier devices 61 are only fixed in terms of their position, but are otherwise freely accessible.

In addition, alternatively to the carrier devices illustrated according to FIGS. 1 to 4, also a non-circular geometry may be provided, for example an oval, a crescent-shaped or sickle-shaped geometry. Furthermore, the carrier devices may also have a polygonal cross-section or a profile, enabling, for example, easier contact of the retaining section 62 on a housing section 39 and the generation of a stroke. In addition, alternatively provision may also be made for a linear retaining section 62 to be configured, to which a V- or U-shaped section is connected, wherein at the bottom of the U- or V-shaped section the operating member 12 is provided. Furthermore, an hourglass-shaped cross-section of a profile may be provided, wherein strokes of the two face sides are enabled by a smaller constriction.

According to an alternative embodiment, which is not shown in detail, the carrier device may also be provided as a housing to accommodate the further components described above. The carrier device therefore may receive, for example, the retaining or catch device, the controller and/or the power supply, so that the carrier device only requires fastening in a predefined position using the retaining section 62 in order to perform a displacement. The carrier device may also only form part of a housing, which subsequently to the attachment of the same to a further housing section can form a complete housing.

The carrier device may furthermore form a basis for a modular design. A linear motion actuator may be provided with or without detent mechanism. In the case of a linear motion actuator without detent mechanism, the catch or retaining device is omitted. The operating member is maintained in the stroke position or control position by applying constant current to the actuating element. This way, for example, a two-point controller is created, the one final position of which is kept energized. When a catch or retaining device is provided, a two-point controller is created, the one final stroke position of which is maintained and secured by a detent or locking mechanism. Alternatively, a multi-stage controller may also be provided, wherein the catch or retaining device comprises a plurality of locking sections, which allow the stroke to be secured in stages. The various types of catch or retaining devices can optionally be added to the carrier device. In addition, the carrier device may be configured without a catch or retaining device and a proportional controller may be formed, the displacement of which is controlled by applying current.

All of the characteristics described above are essential for the invention and may be combined arbitrarily with each other.

The invention claimed is:

1. A linear motion actuator, comprising an operating member, which is displaceable from a basic position in a control position against the force of a spring member using at least one actuating element, the operating member being held in the basic position by applying the force of the spring member and the force of the spring member acting on the operating member being smaller than an actuating force of at least one actuating element that is made of shape memory alloy, whereby the spring member is configured as part of a carrier device, which comprises an operating member or to which an operating member is attached and that at least one actuating element exerts force on wall sections or load transfer elements of the carrier device.

2. The linear motion actuator according to claim 1, whereby the carrier device has a retaining or receiving section, which is provided for attachment to a housing section of a linear motion actuator, on which the carrier device is supported when transferring the operating member from a basic position in a control position.

3. A linear motion actuator according to claim 1, whereby the carrier device is an elastic profiled or hollow body and that at least one actuating element exerts force on two diametrically opposed wall sections, or on load transfer elements which are disposed on two diametrically apposed wall sections.

4. A linear motion actuator according to claim 1, whereby the carrier device is provided as a cylindrical pipe section or ring.

5. A linear motion actuator according to claim 1, whereby at least two load transfer elements are disposed opposite each other on a wall section of the carrier device, on which elements at least one actuating element exerts force whereas one load transfer element is associated with the retaining section and the opposite load transfer element is associated with the operating member.

6. A linear motion actuator according to claim 1, whereby at least two load transfer elements are disposed opposite each other on a lateral, interior or exterior wall section of the carrier device, on which elements at least one actuating element exerts force and at least one load transfer element is disposed offset between 1° and 90° from the retaining section.

7. A linear motion actuator according to claim 1, whereby at least two load transfer elements are disposed opposite each other in pairs on the carrier device and the load transfer elements disposed opposite each other are arranged offset 90° from each other.

8. A linear motion actuator according to claim 1, whereby at least one wire-, belt- or rod-shaped actuating element or at least one closed winding of an actuating element exert force on the load transfer elements of the carrier device.

9. The linear motion actuator according to claim 3, whereby a rotatable steady rest is provided on the carrier device configured as a cylindrical pipe section or ring, which steady rest comprises at least one pair of load transfer elements disposed opposite each other.

10. A linear motion actuator according to claim 1, whereby the operating member is provided on the carrier device interchangeably by a plug or a detent connection.

11. A linear motion actuator according to claim 1, whereby a displacement measuring device is provided for detecting a stroke movement of the operating member in a control position and the control of at least one actuating element is dependent on the detected stroke of the operating member.

12. The linear motion actuator according to claim 11, whereby the displacement measuring device is configured as a mechanical, inductive, capacitive or optical detection device or as a detection device comprising electromagnetic radiation.

13. A linear motion actuator according to claim 11, whereby the displacement measuring device is configured as a Hall sensor and an element of this displacement measuring device is provided on or in the vicinity of the operating member.

14. A linear motion actuator according to claim 1, whereby the operating member is transferred from a basic position in a control position by applying current to the actuating element and the operation member is configured as a two-point controller.

15. A linear motion actuator according to claim 1, whereby the operating member is associated with a catch or retaining device, which fixes the operating member in a control position after having performed a stroke.

16. The linear motion actuator according to claim 15, whereby the catch or retaining device is configured as a clamping device, which exerts force on a clamping section of the operating member or on the carrier device.

17. The linear motion actuator according to claim 15, whereby the catch or retaining device comprises a locking element, which in a locked position interacts with a detent element provided on the operating member or on the carrier device.

18. The linear motion actuator according to claim 17, whereby the detent element provided on the operating member and the locking element exerting force thereon have rows of teeth, a pawl arrangement, self-locking wedging or stepped wedging.

19. The linear motion actuator according to claim 17, whereby the locking element is transferred from a locking position in an unlocking position using at least one shape memory alloy unlocking element.

20. A linear motion actuator according to claim 15, whereby at least one actuating element exerting force on the operating member is actuated in order to transfer the actuating element from a locked control position in a further control position or basic position, so that at least one actuating element is adjusted in terms of the stroke to a stroke that is slightly less than that of the locked stroke position.

21. A linear motion actuator according to claim 15, whereby the operating member is set to several stroke positions between the basic position and the control position using the catch or retaining device and that the linear motion actuator is configured as a multi-stage controller.

22. A linear motion actuator according to claim 1, whereby at least two carrier devices are arranged in series and that a stroke movement of at least one carrier device is transmitted to the operating member, which is controllable by all carrier devices.

23. The linear motion actuator according to claim 22, whereby each actuating element of at least two carrier devices connected in series is controlled individually.

24. A linear motion actuator according to claim 1, whereby at least two carrier devices are arranged parallel to each other and actuate a common actuating element.

25. A linear motion actuator according to claim 1, whereby the stroke position of the operating member is set as a function of the current that is applied to the actuating element and that the linear motion actuator is configured as a proportional controller.

26. A linear motion actuator according to claim 1, whereby at least one actuating element is activated starting at a heating temperature of more than 70° C.

27. A linear motion actuator according to claim 1, whereby at least one uniaxially supported lever mechanism is provided for reversing the direction of motion of the operating member.

28. A linear motion actuator according to claim 1, whereby at least one actuating element is configured as a wire, wire mesh, pipe or the like.

29. A linear motion actuator according to claim 1, whereby the carrier device is elastic and made of a metal material, plastic or composite.

* * * * *